United States Patent [19]

Daly et al.

[11] 4,044,318

[45] Aug. 23, 1977

[54] GANGED RADIO FREQUENCY FILTER

[75] Inventors: Edward J. Daly, Sudbury; Richard Sparks, Bedford; George R. Spencer, Needham, all of Mass.

[73] Assignee: Raytheon Company, Lexington, Mass.

[21] Appl. No.: 579,165

[22] Filed: May 20, 1975

[51] Int. Cl.² .......................... G01S 9/02; H01P 1/20
[52] U.S. Cl. ........................... 333/1; 333/31 R; 333/73 W; 343/16 M
[58] Field of Search .................. 333/1, 1.1, 6, 8, 31 R, 333/83 R, 73 W; 325/335, 336, 423; 343/16 M

[56] References Cited

U.S. PATENT DOCUMENTS

| | | | |
|---|---|---|---|
| 2,649,570 | 8/1953 | Radcliffe | 333/73 W |
| 3,374,436 | 3/1968 | Theiss | 325/336 |
| 3,435,346 | 3/1969 | Allen et al. | 325/423 |
| 3,636,452 | 1/1972 | Nuding | 333/1.1 |
| 3,821,668 | 6/1974 | Cohen | 333/73 W |
| 3,824,500 | 7/1974 | Rothenberg | 333/6 |

Primary Examiner—Alfred E. Smith
Assistant Examiner—David K. Moore
Attorney, Agent, or Firm—Philip J. McFarland; Joseph D. Pannone

[57] ABSTRACT

A three channel electronically tunable filter arrangement for selecting radio frequency signals to be processed in a monopulse receiver is disclosed. Each channel of the disclosed filter arrangement includes an yttrium-iron-garnet (YIG) filter disposed in a common structure so that the resonant frequency of each channel may be controlled by the magnetic field of a single electromagnet. Also disclosed is an alignment method whereby the response of the YIG filter in each channel may be independently adjusted to eliminate any substantial imbalance between channels as the strength of the magnetic field is changed to change the resonant frequencies of such filters.

6 Claims, 5 Drawing Figures

GANGED RADIO FREQUENCY FILTER

BACKGROUND OF THE INVENTION

This invention relates to radiation receiving systems and, more particularly, to a monopulse receiving system incorporating a microwave preselector to provide image rejection and power limiting.

As is known in the art, the subfeedthrough or subclutter visibility of a radar receiver operating in a pulse Doppler mode is limited by the pulse Doppler spectral line existing at the image, or second harmonic frequency, in the envelope of the spectrum of I.F. frequencies existing in such radar receiver. Thus, for example, if the envelope of the spectrum of a pulse Doppler illuminator is down by 65 decibels at 60 MHz from the center frequency of such spectrum, and if a radar receiver employing a 30 MHz I.F. frequency is required to provide 90 decibels of subfeedthrough visibility, at least 25 decibels image rejection must be provided. Further, when monopulse tracking is a requirement, any image rejection means which is employed in the sum and difference channels must be arranged so that no changes in the relative phases and amplitudes of the signals in the different channels occur. That is, "amplitude and phase track" is essential to avoid unacceptable degradation of tracking accuracy.

One technique used to provide image rejection is to employ known "image rejection" mixers to provide down conversion from the R.F. to I.F. frequencies. Conventional image rejection mixers, however, cannot provide the degree of image rejection required. To provide adequate image rejection, known so-called "short circuit" image rejection mixers may be used provided the local oscillator may supply the requisite amount of radio frequency power. Whether an image rejection mixer or short circuit image rejection mixer is used, a microwave bandpass filter and a diode limiter are required in circuit with the mixer to prevent burnout when jamming signals from an enemy radar or interference signals from a friendly source are experienced. Unfortunately, however, such required bandpass filter and limiter will reduce the overall noise figure of the radar receiver.

Another common technique used to provide image rejection in a monopulse receiver is to employ a three channel, double I.F. frequency conversion receiver with a narrow band filter at the first I.F. frequency to reject images at the first I.F. frequency. The narrow band I.F. filters used for such a purpose must, however, be quite large in order to provide the degree of filtering required. The double I.F. conversion technique is, therefore, impractical in applications wherein the size of the receiving system is critical, as when such receiver is to be used in a missile. In addition, a microwave bandpass filter and limiter are still required for protection against undesired electromagnetic radiations such as jamming or interfering signals.

Still another technique used to provide image rejection in a monopulse receiver is to employ a two channel, single frequency conversion receiver with an electrically tunable preselector utilizing single crystal spheres or discs of yttrium-iron-garnet in a microwave resonator (such a resonator being referred to as a YIG filter). In such a system the two monopulse difference signals are time multiplexed through a single receiver channel and the use of the YIG filter in a preselector obviates the need for a microwave bandpass filter and limiter. However, a single pole double throw diode switch, which is required to provide the switching between the two difference channels, adds to the system noise figure and, in addition, the time multiplexed system provides inferior ECM performance in comparison with a three channel monopulse system.

SUMMARY OF THE INVENTION

With this background of the invention in mind, it is an object of this invention to provide a monopulse receiver having improved image rejection.

It is another object of this invention to provide a monopulse receiver having improved protection against undesired electromagnetic radiation.

These and other objects of the invention are attained generally by providing a three channel, single frequency conversion receiver with a three channel YIG filter as a preselector. In a preferred embodiment of the invention, the three channel YIG filter is capable of meeting monopulse phase and amplitude tracking requirements in a plurality of operating bands.

BRIEF DESCRIPTION OF THE DRAWINGS

The aforementioned objects and other features of the invention are explained in the following description taken in connection with the accompanying drawings wherein.

DESCRIPTION OF THE PREFERRED EMBODIMENT

Figure 1:
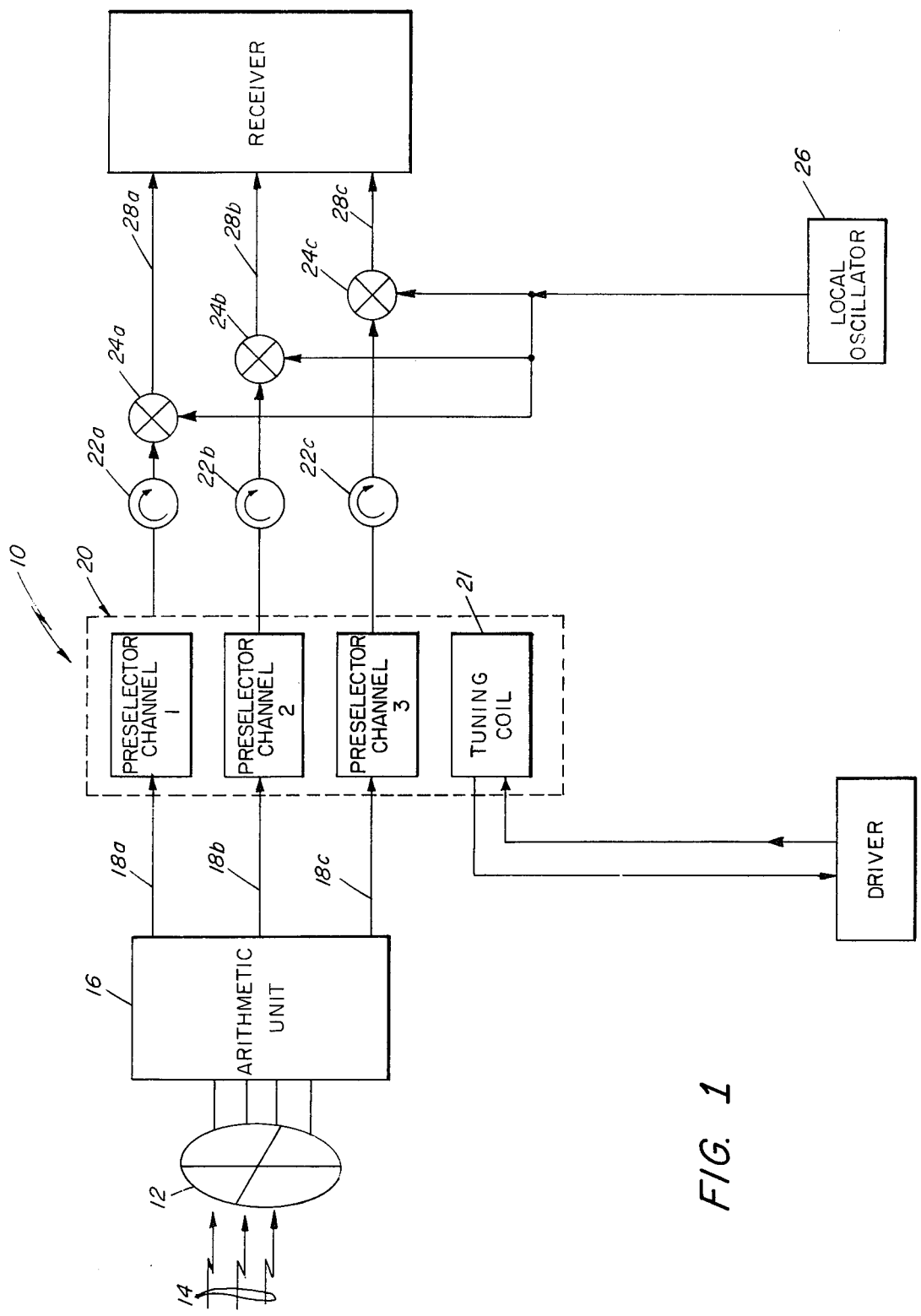
FIG. 1 is a block diagram of the microwave front end of a monopulse receiver embodying the principles of the invention.

Referring now to FIG. 1, it may be seen that microwave front end 10, according to this invention, is comprised of an antenna array 12 which is shown to direct received signals 14 to arithmetic unit 16. Arithmetic unit 16 contains the conventional monopulse arithmetic network (not shown) required to form the monopulse sum and two different channels which appear on lines 18a, 18b and 18c, respectively. The monopulse signals from arithmetic unit 16 are passed through the three channel preselector 20 and then circulators 22a...22c to balanced mixers 24a...24c, wherein they are combined with signals from local oscillator 26 to form suitable IF signals on lines 28a...28c. It is noted that, for convenience, the tuning coil of the three channel YIG filter is shown here schematically as a single coil.

Figure 2:
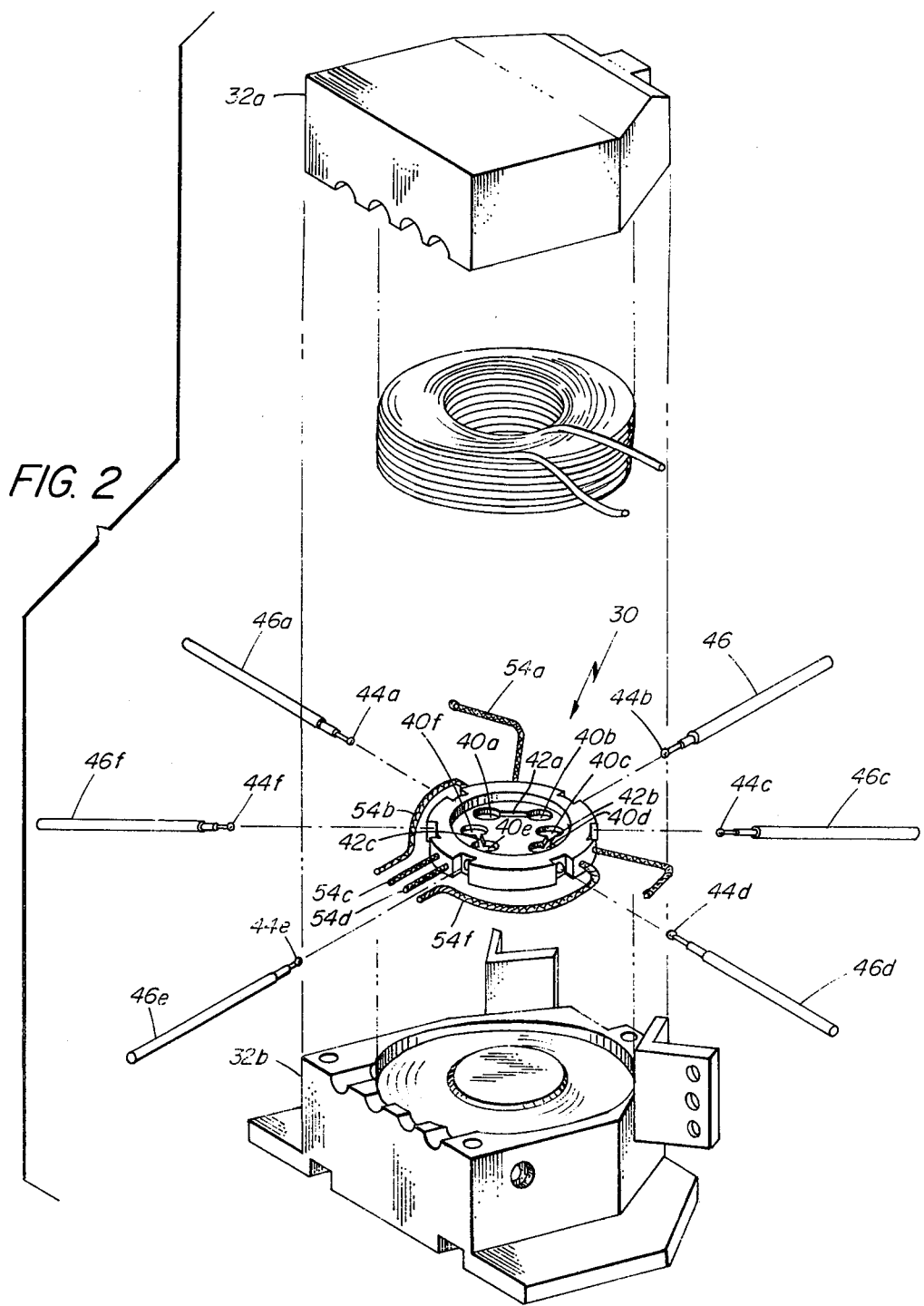
FIG. 2 is an isometric representation of a three channel YIG filter according to the invention, exploded to better illustrate details.

Referring now to FIG. 2, the three channel preselector 20 is shown to include single crystal yttrium-iron-garnet spheres making up a so-called YIG filter contained in a single housing (not numbered). The basic operation of a YIG filter, including the electronic tuning thereof, is described in two patents, namely U.S. Pat. No. 3,435,346 entitled "Electronically Tunable Receiver" which issued to Allen on Mar. 25, 1969, and U.S. Pat. No. 3,435,385 entitled "Electronically Tunable YIG Filter Having An Electronically Variable Bandwidth" which issued to Cohen on Mar. 25, 1969. Briefly, a YIG filter is a solid state device which includes yttrium-iron-garnet spheres in a magnetic field and suitable coupling structures. In such a device, the resonant frequency is adjusted by controlling the applied magnetic field and not by controlling the physical dimensions of a resonant chamber. The operating, or resonant, frequency of such a device is determined by the strength of the applied magnetic field and narrow bandwidths may be attained in operation with small, in terms of wavelength, devices. The three channel YIG filter here is comprised of two major subassemblies; an RF circuit 30 and an electromagnet (not numbered).

Figure 3:
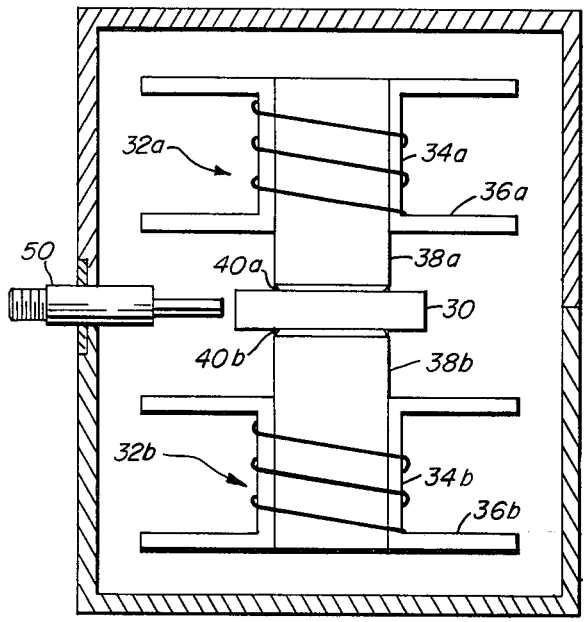
FIG. 3 is a cross-section, greatly simplified and taken along the plane marked 3—3 in FIG. 2, of the electromagnet in the three channel YIG filter.

Referring to FIG. 3, the electromagnet is shown to be comprised of a two piece yoke assembly, the upper and lower halves being labeled 32a and 32b respectively, and two coils, 34a, 34b. The two coils 34a, 34b are wound on coil bobbins 36a, 36b and are connected together in series so as to be energized, when desired, from any convenient D.C. source (not shown). The two yoke halves 32a, 32b are machined in such a manner as to form central pole pieces 38a, 38b, whose diameters are fixed such that flux saturation does not occur even when the highest current for which the coils 34a, 34b are designed is passed through such coils. The pole piece tips 40a, 40b are machined and positioned so that the magnetic field between them is, for all practical purposes, uniform in the gap (not numbered) between such pole pieces when current is passed through the coils 34a, 34b.

The coils 34a, 34b are individually layer wound with turns bonded together. The coils 34a, 34b slip over pole pieces 38a, 38b to almost completely fill the internal volume of the yoke halves 32a, 32b. Once the yoke and pole piece diameters are specified, the size of the wire determines the number of turns that comprise the coil, and hence coil resistance, coil inductance and sensitivity of the completed filter.

Referring back now to FIG. 2, an exploded view of the R.F. circuit 30 of the contemplated three channel YIG filter is shown. The R.F. circuit 30 is comprised of six small microwave cavities 40a...40f bored through a metal plate (not numbered). The microwave cavities 40a...40f are symmetrically arranged along the circumference of a circle. Adjacent pairs of cavities 40a...40f are connected by means of slots 42a...42c milled into the metal plate. Six YIG spheres 44a...44f (shown attached to the inner ends of dielectric rods 46a...46f) are oriented along a specific crystallographic axis (for reasons to be explained hereinafter) in an external fixture (not shown) and are then bonded to dielectric rods 46a...46f. The dielectric rods 46a...46f are used to insert the YIG spheres 44a...44f through radial tunnels (not numbered) in the metal plate and position such YIG spheres 44a...44f in the center of microwave cavities 40a...40f. The dielectric rods 46a...46f, which here are boron nitride, must be sufficiently rigid to maintain each one of the YIG spheres 44a...44f in a fixed relationship with corresponding coupling loops 48a...48f and must also be good thermal conductors in order either to provide means for heating the YIG spheres (when environmental conditions so require) or to dissipate heat generated in YIG spheres 44a...44f (when they are in a saturated condition). There is an inherent tendency for the YIG spheres to saturate at high R.F. input power levels and it is this feature of the YIG spheres which permits the preselector 20 to act as a limiter.

Flanged coaxial connectors 50a...50f are soldered onto semirigid coaxial cables 54a...54f which are terminated in coupling loops 48a...48f. The flanged coaxial connectors 50a...50f are screwed to the outside surface of yoke halves 32a, 32b to form a self-shielded structure (not numbered) to minimize flux leakage and susceptibility of the filter to the effect of external magnetic fields.

Figure 4:
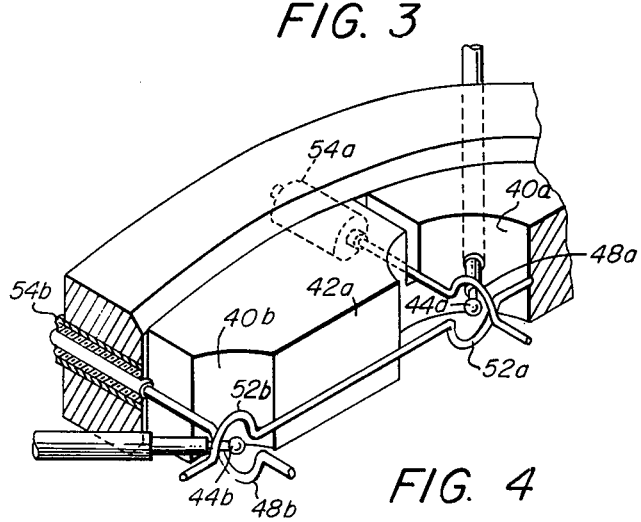
FIG. 4 is a greatly enlarged view of an exemplary channel of the three channel YIG filter shown in FIG. 2, such illustrated channel being shown assembled to show how coupling is effected.

Referring now to FIG. 4, an exemplary one of the three channels of the preselector 20 is shown. Each channel is shown to be comprised of two adjacent cavities 40a, 40b which are joined together by means of slot 42a. An R.F. input connector 50a and an RF output connector 50b are shown connected, respectively, to cavities 40a and 40b by means of coupling loops 48a and 48b (which here are extensions of the coaxial center conductors). The opposite ends of coupling loops 48a, 48b are intimately connected (here by means of a solder connection) to, respectively, the walls of cavity 40a and cavity 40b. The orthogonal coupling loops 52a, 52b are formed by a single wire which also is intimately connected to the wall of cavity 40a. Such wire is passed, as shown, through slot 42a into cavity 40b to an intimate connection on the wall of cavity 40b. As thus configured, the exemplary channel presents essentially a short circuit to incident R.F. signals except when the applied magnetic field causes the YIG spheres 44a, 44b to resonate at the frequency of the incident R.F. signal.

The number of YIG spheres used in any filter channel controls the bandpass shape of said filter channel. That is, for each YIG sphere used in a given channel a 6 decibel per octave selectivity slope is obtained. Thus, the two sphere YIG filter being described has a 12 decibel per octave skirt selectivity. Once the bandpass selectivity is established, the exact shape of the filter bandpass is dependent upon the degree of coupling between the YIG spheres 44a, 44b and the RF coupling loops 48a, 48b and 52a, 52b. For the two sphere channel, the bandpass shape may be adjusted from a smooth, rounded undercoupled response to a pronounced double-peaked, overcoupled response. The degree of coupling is frequency sensitive and therefore the bandpass shape will vary over the tuning range. In general, a filter which is slightly overcoupled at the low frequency end of the tuning range may change to a critically coupled condition at the high end of the frequency tuning range. In addition, because the required flux density through the YIG spheres is a function of temperature, variations in filter performance with temperature may result. In general, the parameters which control the degree of coupling are the loop diameter, the YIG sphere diameter and the spacing between pole pieces 38a, 38b.

Once the above-mentioned coupling parameters have been established, they remain fixed for a given frequency band of operation. However, because the presently contemplated preselector application requires that each of the three channels phase and amplitude track each other and have identical insertion loss and frequency amplitude response but practical manufacturing procedures are not sufficiently accurate to attain such results, there exists a need for adjustments in order to align each of the three channels. That is, if factors such as manufacturing tolerances, differences in the magnetic properties of the material from which the YIG spheres are fabricated and changes in environmental conditions are not compensated, the desired accuracy with which the three channels may be tuned over a frequency band may not be attained. The filter channels may be stabilized against temperature variations by proper alignment of the crystallographic axis of the YIG spheres 44a...44f and by the use of temperature compensating alloys in the magnetic structure. The alignment of the crystallographic axes is accomplished by rotating YIG spheres 44a...44f by means of dielectic rods 46a...46f while monitoring the response of each filter channel in a manner to be described hereinafter. Additional control over the filter channel response may be had by controlling the position of the YIG spheres 44a...44f within cavities 40a...40f, again by means of dielectric rods 46a...46f. Once each of the channels is properly aligned with respect to each other, the dielectric rods 46a...46f are bonded in place by means of a suitable epoxy (not shown).

As a result of the physical configuration of the three channel preselector 20, there are unequal path lengths in the filter channels. This may be seen by referring to FIG. 2 wherein the length of cables 54c and 54d is shown to be shorter than that of cables 54a, 54b, 54e and 54f. These unequal path lengths require that some external compensation be provided so that these unequal path lengths do not prevent accurate phase tracking. In practice, the additional compensation is provided by means of using slightly longer cables (not shown) in the channel corresponding to the filter channel including cables 54c and 54d.

Figure 5:
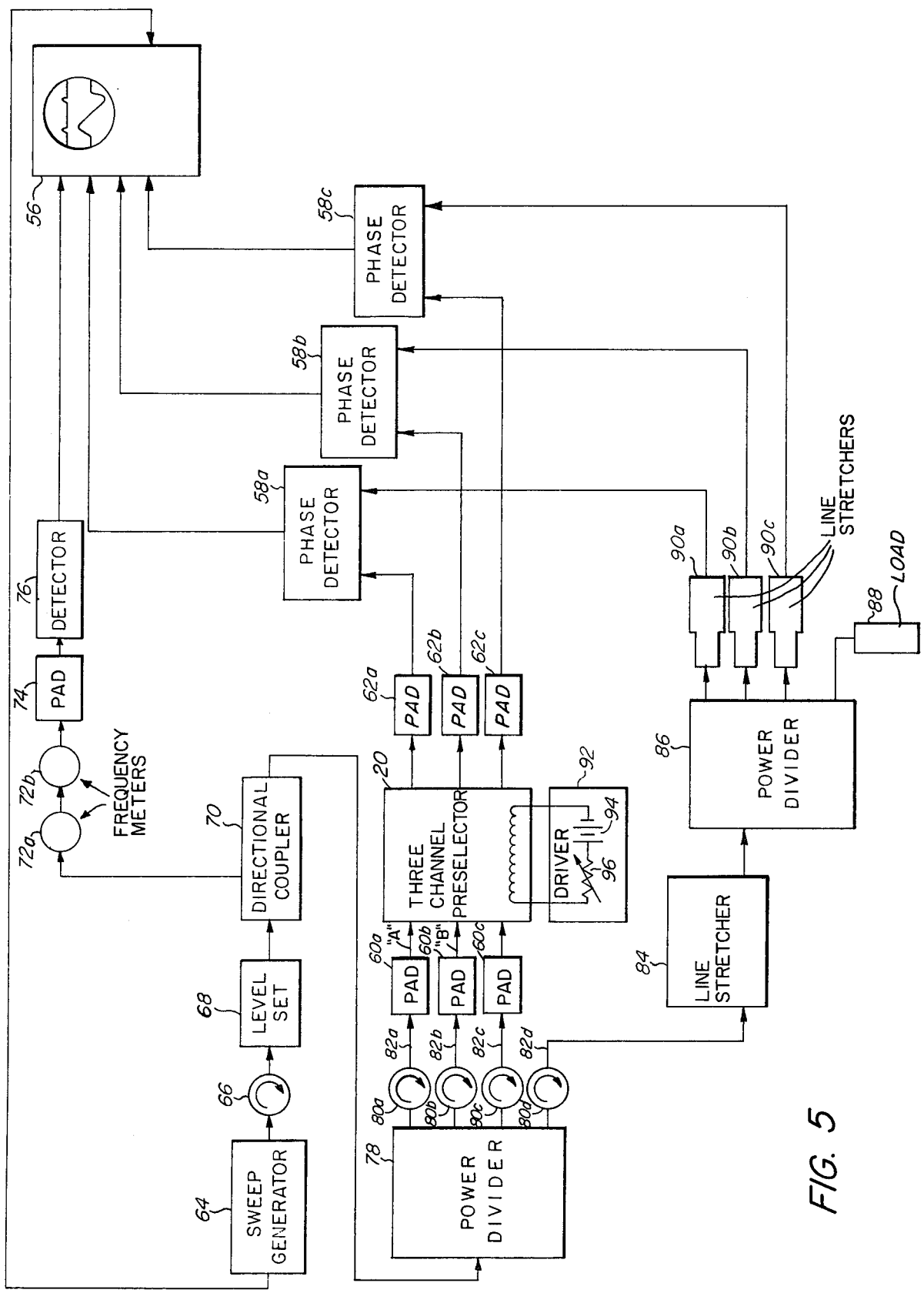
FIG. 5 is a block diagram illustrating an adjustment and test setup for a three channel YIG filter according to the invention.

Referring now to FIG. 5, a block diagram of a test setup for monitoring the phase tracking performance of the three channel preselector 20 (FIG. 2) over the frequency band and temperature range of operation is shown. The illustrated test setup allows one to monitor all three channels simultaneously so that time dependent bias current variations (which in turn cause error in phase tracking) may be eliminated as a source of error. The test setup includes a four channel oscilloscope 56 for simultaneous and superimposed display of the bandpass responses of each channel of the YIG preselector under test.

When measuring the phase tracking performance of the three channel preselector 20, matched microwave phase detectors 58a...58c terminate each of the preselector output ports. For initial calibration, the three channel preselector 20 is removed from the circuit and matching pads 60a...60c are connected directly, by means of jack-to-jack connectors (not shown) to matching pads 62a...62c. A swept frequency RF oscillator, hereinafter referred to as the sweep generator 64, serves as the R.F. source and is operated to cover the frequency band of interest. The R.F. output of the sweep generator 64 is fed through isolator 66 to level set attenuator 68. With the three channel preselector 20 removed from the circuit, the level set attenuator 68 should be set such that the R.F. drive level, as measured at the output of matching pads 60a...60c, is maintained below a level corresponding to the limiting level of the three channel preselector 20. The output from the level set attenuator 68 is fed directly to directional coupler 70. The output from one coupled arm of coupler 70 is fed through frequency meters 72a, 72b and then through attenuator pad 74 to crystal detector 76. The output from crystal detector 76 is fed to one of the channels of the four channel oscilloscope 56 and serves as a reference. The frequency meters 72a, 72b are set to the low and high ends, respectively, of the operating frequency band so that the display of the frequency markers on the oscilloscope 56 provides a direct precision readout of the limits of the operating frequency. The attenuator pad 74 is included to ensure that the crystal detector 76 is operating as a square law detector.

The output from the second arm of coupler 70 is connected to a 4:1 divider 78 wherein such output is divided into four signals on lines 82a...82d, each of equal amplitude. Isolators 80a...80d are included to provide the high isolation, mentioned hereinabove, between lines 82a...82d. The signals on lines 82a...82c provide the desired isolated inputs to the three channels of the three channel preselector 20 (when that element is in place). The signal on line 82d serves as a reference signal and provides the second input to each of phase detectors 58a...58c. A precision line stretcher 84 is included in the reference signal path to provide coarse line length equalization in the reference signal path, and to provide a means of calibrating the vertical scale of four channel oscilloscope 56 directly in degrees. The power divider 86 in the reference signal path is preferably identical to power divider 78. A matched load 88 (here a 50 ohm R.F. load) terminates the fourth port of the power divider 86. The line stretchers 90a...90c in each reference signal path are adjusted (with the three channel preselector 20 to be tested replaced by jack-to-jack connectors) to give a flat amplitude response (as viewed on four channel oscilloscope 56) over the entire frequency band of operation.

When the three channel preselector 20 to be tested is placed in the test circuit, some readjustment of the line stretchers 90a...90c may be required if there are unequal line lengths in the filter channels. As mentioned hereinabove, one of the channels of the three channel preselector 20 is shorter than the other two channels and, therefore, some external compensation is necessary. A straight coaxial plug-to-jack adapter (not shown) may be inserted at the points marked "A" and "B", if necessary, to equalize line lengths between the pads 60a...60c and the pads 62a...62c.

A typical S-curve phase detector response is observed for each channel when the measurement system is operating correctly. With the phase detectors 58a...58c matched as described, the peak-to-peak amplitude and general S-curve shape for each channel should be the same over the entire frequency band. Thus, any offsets in zero crossing frequency or phase slope deviations may be attributed to the filter channel as the bias current from the YIG driver 92 is increased or decreased over the tuning range. As may be seen, the YIG driver 92 is, in effect, the same as a D.C. source 94 connected, through a variable resistor 96, to the tuning coil (not numbered) of the three channel preselector 20 under test. The individual channels in the three channel preselector 20 may be adjusted (as by rotating the YIG spheres, for example) until a best match is attained throughout the band of operating frequencies. By eliminating the reference channel and replacing phase detectors 58a...58c with matched crystal detectors, the same test circuit may be used to monitor amplitude tracking performance of the preselector 20.

Having described a preferred embodiment of a multichannel electronically tunable filter particularly suited for use as a bandpass filter in the radio frequency section of a monopulse receiver, and a method of testing such a filter, it will now be apparent to one of skill in the art that changes may be made without departing from the concepts of this invention. For example, the bandpass characteristics of the individual channels may be changed by changing the number of cavities. It is felt, therefore, that this invention should not be restricted to its disclosed embodiment, but rather should be limited only by the spirit and scope of the appended claims.

What is claimed is:

1. In a monopulse receiver wherein radio frequency energy received by an antenna is passed through an arithmetic unit to form, in a different one of three separate channels, a sum and two difference radio frequency signals, the improvement comprising:
   a. an electrically tunable filter arrangement having a separate filter in each different one of the three separate channels, each one of said separate filters having substantially the same insertion loss and frequency response characteristics;
   b. means for tuning, over a preselected band of radio frequencies, each separate filter to correspond with the frequency of a desired portion of the radio frequency energy received by the antenna; and
   c. means for adjusting the bandpass response of each separate filter so that each of the separate filters phase and amplitude track each other.

2. The improvement as in claim 1 wherein each separate filter comprises:
   a. an input cavity and an output cavity;
   b. means for coupling the radio frequency signal in one of the three channels through one input cavity and one output cavity;
   c. a single electromagnet disposed to produce a magnetic field having substantially constant flux density through each input cavity and output cavity; and
   d. a sphere of yttrium-iron-garnet disposed within each input cavity and each output cavity to tune each such cavity in response to the magnetic field.

3. The improvement as in claim 2 wherein the coupling means are comprised of orthogonal wire loops located, respectively, above and below the sphere of yttrium-iron-garnet.

4. The improvement as in claim 3 wherein the means for tuning includes driver means for varying the electrical current through the single electromagnet to change the flux density of the magnetic field passing through each sphere of yttrium-iron-garnet.

5. The improvement as in claim 4 wherein the means for adjusting the bandpass response of each of the filters includes means for independently orienting each sphere with respect to the magnetic field and the walls of each different input cavity and output cavity.

6. The method of balancing the individual channels in a multi-channel electronically tunable radio frequency filter to cause any radio frequency signals within a predetermined band of frequencies passed through such channels to be subjected to similar phase shifts and amplitude changes, such method comprising the steps of:
   a. calibrating the test equipment with the multichannel filter removed from the test circuit;
   b. inserting the multichannel filter into the test circuit;
   c. simultaneously passing, through radio frequency lines having identical phase and amplitude characteristics and a multichannel filter to be balanced, equal radio frequency signals periodically changing over the predetermined band of frequencies;
   d. simultaneously detecting the radio frequency signals out of each channel of the multichannel filter to be balanced;
   e. simultaneously displaying all of the detected radio frequency signals to provide visual indications of any differences between such detected signals; and
   f. adjusting each one of the channels of the multichannel filter to null any differences between the detected radio frequency signals.

* * * * *